T. G. NYBORG.
MULTICYLINDER INTERNAL COMBUSTION ENGINE OF THE HORIZONTAL TYPE.
APPLICATION FILED FEB. 25, 1914.
1,161,152.
Patented Nov. 23, 1915.
2 SHEETS—SHEET 1.
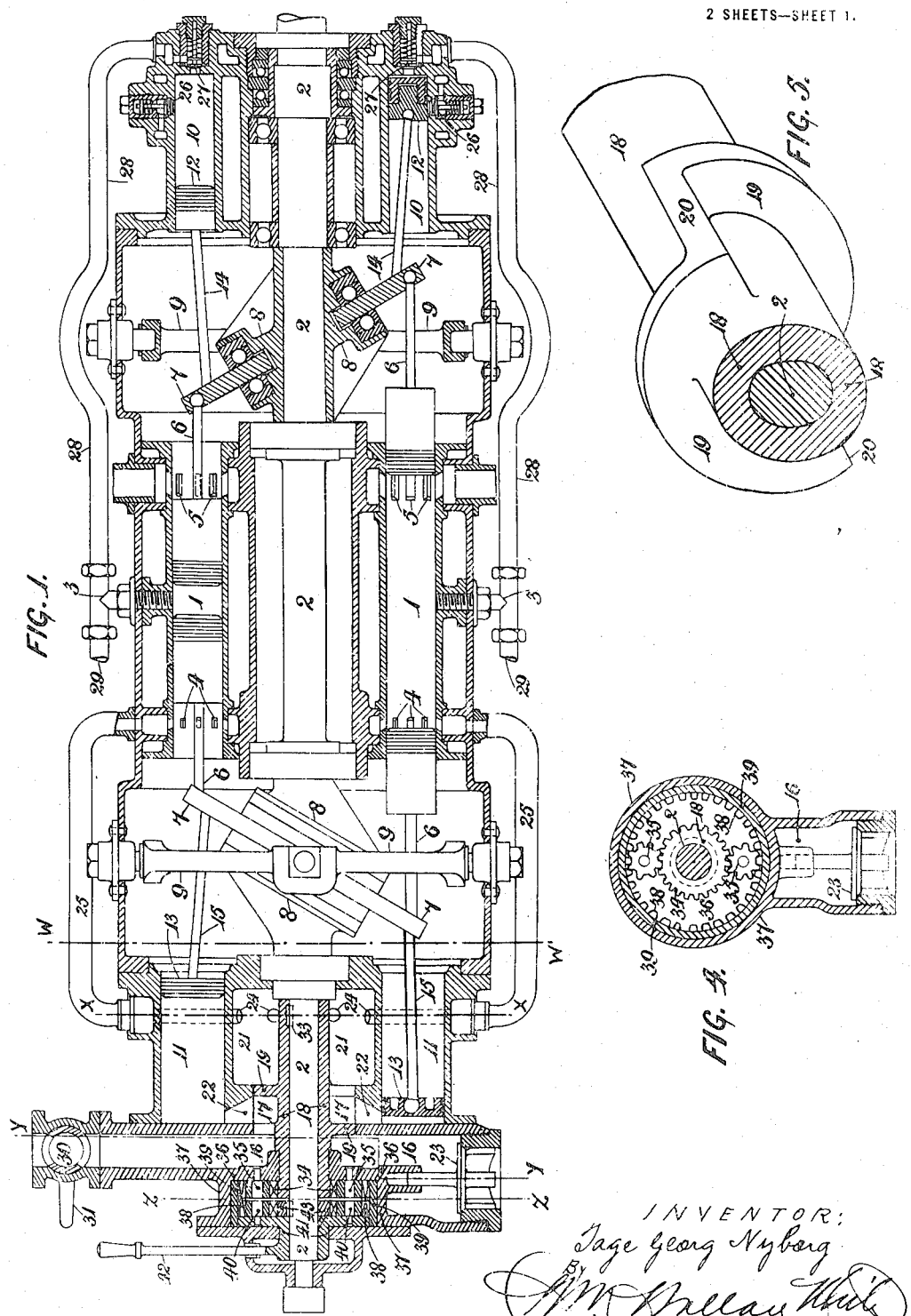
INVENTOR:
Jage Georg Nyborg T. G. NYBORG.
MULTICYLINDER INTERNAL COMBUSTION ENGINE OF THE HORIZONTAL TYPE.
APPLICATION FILED FEB. 25, 1914.
1,161,152.
Patented Nov. 23, 1915.
2 SHEETS—SHEET 2.
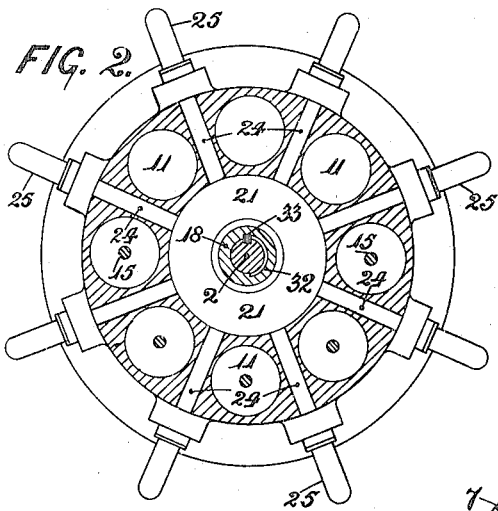
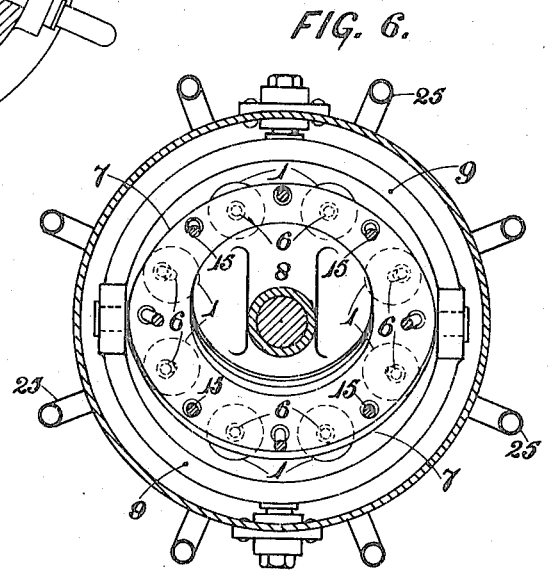
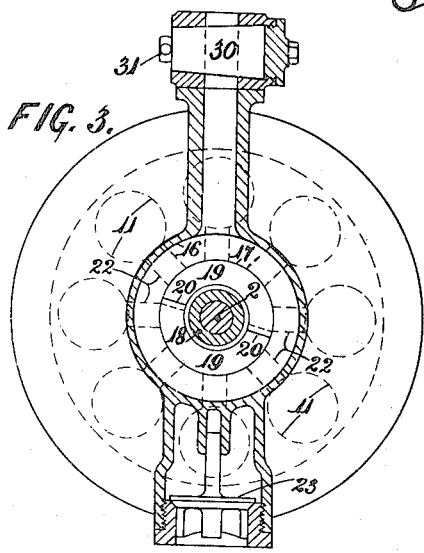
INVENTOR:
Tage Georg Nyborg,
By
ATTY.

UNITED STATES PATENT OFFICE.

TAGE GEORG NYBORG, OF NEWCASTLE-UPON-TYNE, ENGLAND.

MULTICYLINDER INTERNAL-COMBUSTION ENGINE OF THE HORIZONTAL TYPE.

1,161,152.　　　　　Specification of Letters Patent.　　Patented Nov. 23, 1915.

Application filed February 25, 1914. Serial No. 820,844.

*To all whom it may concern:*

Be it known that I, TAGE GEORG NYBORG, a subject of the King of Denmark, residing at 9 Callerton Place, in the city and county of Newcastle-upon-Tyne, England, have invented new and useful Improvements in Multicylinder Internal-Combustion Engines of the Horizontal Type, of which the following is a specification.

This invention relates to multi-cylinder internal-combustion engines of the type wherein a number of cylinders are arranged around a central horizontal shaft, the axes of said cylinders being parallel to the axis of said central shaft and the piston rods of the cylinders being connected to inclined crank disks mounted around inclined cranks on said central shaft in gimbals or the like and co-acting with the cranks to rotate the shaft, and the invention has for its object to provide an improved arrangement of the air-pumps in such engines and, in combination therewith, simple and improved means for starting and reversing the engine.

According to this invention I arrange the cylinders of the high and low pressure air-pumps around the central shaft in a similar fashion, and at the opposite sides of the inclined crank disks, to the engine cylinders, and I connect the piston rods of said air-pumps to said crank disks so that the pistons of the air-pumps are driven thereby, the admission and emission of air to and from the cylinders of said low pressure air-pumps being controlled by a rotary valve mounted on and rotated by said central shaft. In combination with this arrangement of the air-pumps I provide means for starting the engine comprising a valve adapted to admit compressed air to the air supply chamber of the low-pressure air-pumps, the opening of said compressed air valve automatically closing the valve admitting atmospheric air to said air supply chamber, so that the engine is run by the admission of compressed air, controlled by said rotary valve, to the cylinders of the low-pressure air-pumps, which compressed air, acting upon the pistons and piston rods of said air-pumps, drives the inclined crank disk until the engine attains sufficient speed to be run by the engine cylinders, and I also provide means whereby the rotary valve controlling the admission and emission of air to and from the cylinders of the low-pressure air-pumps may be rotated 180° to reverse the engine.

I will fully describe my invention with reference to the accompanying drawings wherein Figure 1 is a central longitudinal section of an eight cylinder horizontal internal-combustion engine of the type referred to and embodying my invention; Figs. 2, 3 and 4 are sections on the lines X—X, Y—Y and Z—Z respectively in Fig. 1 looking to the right in each case; and Fig. 5 is a perspective view, to a larger scale, of the rotary valve hereinafter more particularly described. Fig. 6 is a sectional view taken on the line W—W of Fig. 1 looking to the right.

Referring to the drawings, the engine comprises eight cylinders 1—1 arranged around a central horizontal shaft 2, the axes of said cylinders being parallel to the axis of the central shaft. Each cylinder 1 is provided with an injection valve 3 and with inlet ports 4—4 and exhaust ports 5—5, and the piston rods 6—6 of the cylinders are connected to inclined crank disks 7, 7 mounted around inclined cranks 8, 8 on the central shaft 2. The crank disks 7, 7 are pivoted to gimbals 9, 9 which in turn are pivoted to the outer casing of the engine, the pivots of the disks being at right angles to the pivots of the gimbals. The disks 7, 7 are oscillated about the inclined cranks 8, 8 by the piston rods 6—6 and co-act with said cranks to cause the same and the central shaft 2 to rotate.

According to the embodiment of this invention illustrated, I arrange the cylinders 10—10 of the high pressure air-pumps around the central shaft 2 so that the axes of said cylinders are parallel to the central shaft in a similar fashion to the cylinders 1—1 of the engine, but at the opposite side of the right-hand inclined crank disk 7, and I also similarly arrange the cylinders 11—11 of the low pressure air-pumps at the opposite side to the engine cylinders 1—1 of the left-hand inclined crank disk 7. The cylinders 10—10 and 11—11 of the air-pumps are provided with pistons 12—12 and 13—13 and piston rods 14—14 and 15—15 as usual, and said piston rods are suitably connected to the inclined crank disks 7, 7 so that, when the engine is running the air-pumps are directly driven from the inclined crank disks. The air pumps are preferably so disposed that their piston rods are connected to the inclined crank disks so as to be spaced alternately with the engine piston rods but on opposite sides of said crank disks. Air at atmospheric pressure is admitted to the cylinders 11—11 of the low pressure air-pumps from an air supply chamber 16, the admission being controlled by a rotary valve 17 mounted on a sleeve 18 on and driven by the central shaft 2 of the engine. The rotary valve 17 is constituted, as shown best in Fig. 5, by two semicircular disks 19, 19 connected at their ends by members 20, 20 so as to form two compartments around the sleeve 18, one opening into the air supply chamber 16 and the other into an annular compressed-air chest 21, as shown in Fig. 1, each compartment also communicating through the ports 22—22 with the cylinders 11—11 of the low pressure air-pumps.

The air supply chamber 16 is provided with an air-inlet valve such as 23 adapted to be automatically opened to admit air from the atmosphere by the suction of the air-pumps. The low pressure air-pumps, under the control of the rotary valve 17, deliver compressed air to the compressed-air chest 21 from whence it flows through ports 24—24 and pipes 25—25 to the inlet ports 4—4 of the engine cylinders. The cylinders 10—10 of the high pressure air-pumps are provided with atmospheric air-inlet valves 26—26 and delivery valves 27—27. The compressed air from the cylinders 10—10 of the high pressure air-pumps is led by pipes 28—28 to the injection valves 3—3 of the engine cylinders for the purpose of vaporizing the fuel as usual, said fuel being led from a suitable source of supply to the injection valves 3—3 by pipes 29—29. If desired the compressed air from the high pressure air-pumps, or a portion of it, may be led to a storage reservoir.

For starting the engine I provide, in combination with the above described arrangement of the air-pumps, a valve 30 controlled by a lever 31 and adapted to admit compressed air from a suitable reservoir or supply to the air supply chamber 16. When it is desired to start the engine, the lever 31 controlling the compressed air admission valve 30 is operated to open the valve to supply compressed air to the air supply chamber 16 of the low pressure air-pumps. The pressure of the compressed air in the chamber 16 immediately closes the atmospheric air-inlet valve 23, and, under control of the rotary valve 17, acts upon the pistons 13—13 in the cylinders 11—11 of the low pressure air-pumps to operate same after the manner of a compressed-air engine to drive the left-hand inclined crank disk 7 through their piston rods 15—15 and thus start the engine, the compressed air, after acting upon the pistons of the low pressure air-pumps, passing through the compressed-air chest 21, ports 24—14, pipes 25—25, the engine cylinder inlet ports 4—4 and the engine cylinders to the exhaust ports 5—5. When the engine has been run by the compressed air for a few revolutions, sufficient speed will be attained to run the engine by the engine cylinders in the normal way. The compressed air admission valve 30 is then closed, and the suction of the low pressure air-pumps draws air into the air supply chamber 16 through the atmospheric air-inlet valve 23 to feed the low pressure air-pumps.

It will be seen that, while the engine is starting, the compressed air is allowed to pass through the low pressure air-pumps into the engine cylinders to charge same with pure air so that fuel can be admitted to the cylinders directly the engine has started, and the supply of compressed air can be gradually cut off from the engine as the air-pumps take up their normal work of supplying the engine cylinders with charges of pure air. When the engine is not to be run on the Diesel principle, a carbureter will be arranged in conjunction with the atmospheric air-inlet valve 23 so that explosive mixture is normally drawn in by the low pressure air pumps and delivered through the air chest 21 to the inlet ports 4—4 of the engine cylinders. The change over from running on compressed air alone to running in the normal fashion is a gradual change. With my improved method of starting, it is possible to start the engine on full load.

For reversing the engine I provide reversing means for rotating through 180° the rotary valve 17 which controls the air admission and emission to and from the cylinders 11—11 of the low pressure air-pumps. The sleeve 18 of the rotary valve 17 is provided with a semi-circular groove 32, as shown best in Fig. 2, with which a key 33 on the central shaft 2 co-acts to rotate the rotary valve. The sleeve 18 is also provided with teeth 34 adapted to co-act with fixed pinions 35, 35 suitably mounted on the end wall 36 of an annular box or casing 37 inclosing the reversing means. The fixed pinions 35, 35 also engage with teeth 38 upon the inner surface of a ring 39 mounted in the annular box or casing 37 and free to rotate therein. The toothed ring 39 is rotated by pinions 40, 40 provided on a sleeve 41 freely mounted on the central shaft 2 and provided with a suitable lever 42 or the like whereby it may be rotated, said pinions 40, 40 forming the coupling between a toothed wheel 43 mounted on and keyed to the central shaft 2 of the engine and the toothed ring 39. When the engine is running the rotary valve 17 is driven by the key 33 coacting with one end of the semi-circular groove 32 in the sleeve 18, and the reversing gear or means runs idly. When however it is desired to reverse the engine, the sleeve 41 carrying the pinions 40, 40 is rotated by its lever 42 to rotate the rotary valve 17 through 180° by the pinions 40, 40, toothed ring 39, pinions 35, 35 and teeth 34 to cause the other end of the semi-circular groove 32 in the sleeve 18 to be engaged by the key 33, so that, when the compressed air admission valve 30 is opened to start the engine, the compressed air is admitted to the cylinder of the low pressure air-pumps diametrically opposite to that to which it would have been admitted had the reversing means not been operated, and the engine is started in the reverse direction.

What I claim and desire to secure by Letters Patent is:—

1. A multi-cylinder internal-combustion engine comprising a casing, gimbals mounted transversely in the casing, a shaft disposed longitudinally of the casing and passing through the said gimbals, inclined cranks on said shaft, inclined crank disks mounted around said inclined cranks and pivoted to the gimbals, a plurality of cylinders arranged around the shaft between the gimbals the axes of said cylinders being parallel with the axis of said shaft, piston rods connected to the inclined crank disks, cylinders of low pressure air pumps arranged around the shaft on the opposite side of one of the gimbals to that on which the engine cylinders are disposed, the said air pump cylinders being parallel with the axis of the shaft, and pistons in said cylinders connected with their respective crank disks.

2. A multi-cylinder internal-combustion engine comprising a casing, gimbals mounted transversely in the casing, a shaft disposed longitudinally of the casing and passing through the said gimbals, inclined cranks on said shaft, inclined crank disks mounted around said inclined cranks and pivoted to the gimbals, a plurality of cylinders arranged around the shaft between the gimbals the axes of said cylinders being parallel with the axis of said shaft, piston rods connected to the inclined crank disks, cylinders of high pressure air pumps arranged around the shaft on the opposite side of one of the gimbals to that on which the engine cylinders are disposed, cylinders of low pressure air pumps arranged around the shaft on the opposite side of the other gimbal to that on which the engine cylinders are disposed, the said air pump cylinders being parallel with the axis of the shaft, and pistons in said cylinders connected with their respective crank disks.

3. A multi-cylinder internal-combustion engine comprising a casing, gimbals mounted transversely in the casing, a shaft disposed longitudinally of the casing and passing through said gimbals, inclined cranks on said shaft, inclined crank disks mounted around said inclined cranks and pivoted to the gimbals, a plurality of cylinders arranged around the shaft between the gimbals the axes of said cylinders being parallel with the axis of said shaft, piston rods connected to the inclined crank disks, cylinders of high pressure air pumps arranged around the shaft on the opposite side of one of the gimbals to that on which the engine cylinders are disposed, cylinders of low pressure air pumps arranged around the shaft on the opposite side of the other gimbal to that on which the engine cylinders are disposed, the said air pump cylinders being parallel with the axis of the shaft, pistons in said cylinders connected with the respective crank disks, a compressed air chamber, a rotary valve on and rotated by said shaft, said valve being disposed between the air chamber and the low pressure air pump cylinders and controlling the admission and emission of compressed air to and from the said cylinders of the low pressure air pumps, a passage from the air chamber to a source of supply of compressed air, a valve in said passage, and a valve in said chamber adapted to be closed by compressed air in the chamber.

4. A multi-cylinder internal-combustion engine comprising a casing, gimbals mounted transversely in the casing, a shaft disposed longitudinally of the casing and passing through the said gimbals, inclined cranks on said shaft, inclined crank disks mounted around said inclined cranks and pivoted to the gimbals, a plurality of cylinders arranged around the shaft between the gimbals the axes of said cylinders being parallel with the axis of said shaft, piston rods connected to the inclined crank disks, cylinders of high pressure air pumps arranged around the shaft on the opposite side of one of the gimbals to that on which the engine cylinders are disposed, cylinders of low pressure air pumps arranged around the shaft on the opposite side of the other gimbal to that on which the engine cylinders are disposed, the said air pump cylinders being parallel with the axis of the shaft, pistons in said cylinders connected with their respective crank disks, a compressed air chamber, a rotary valve on and rotated by said shaft said valve being disposed between the air chamber and the low pressure air pump cylinders and controlling the admission and emission of compressed air to and from the said cylinders of the low pressure air pumps, a passage from the air chamber to a source of supply of compressed air, a valve in said passage, and a valve in said chamber adapted to be closed by compressed air in the chamber and means for rotating through 180° the rotary valve.

In testimony whereof I have signed my name to this specification in the presence of two subscribing witnesses.

TAGE GEORG NYBORG.

Witnesses:
 HERBERT HOWARD,
 GEORGE FORSTER.